March 31, 1942.  A. N. PLANTE  2,278,281
POULTRY FEEDER
Filed Sept. 3, 1940  3 Sheets-Sheet 1
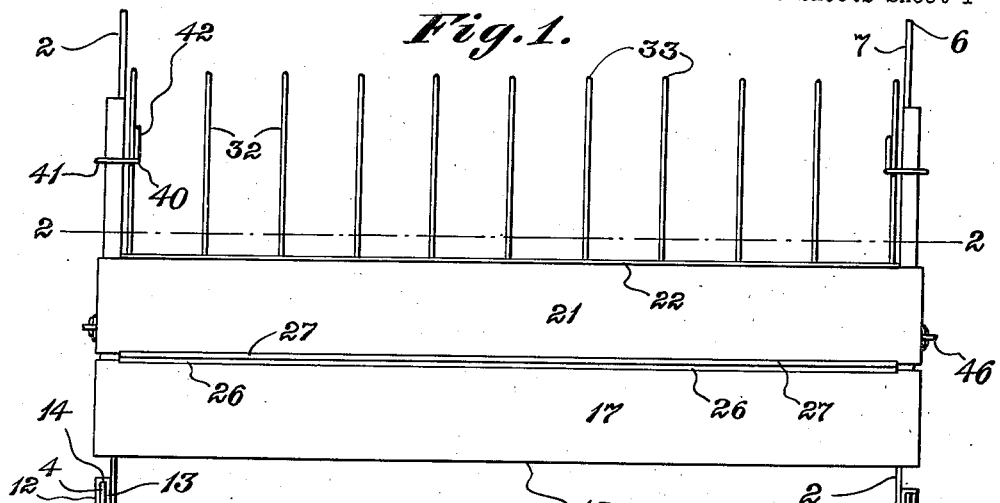
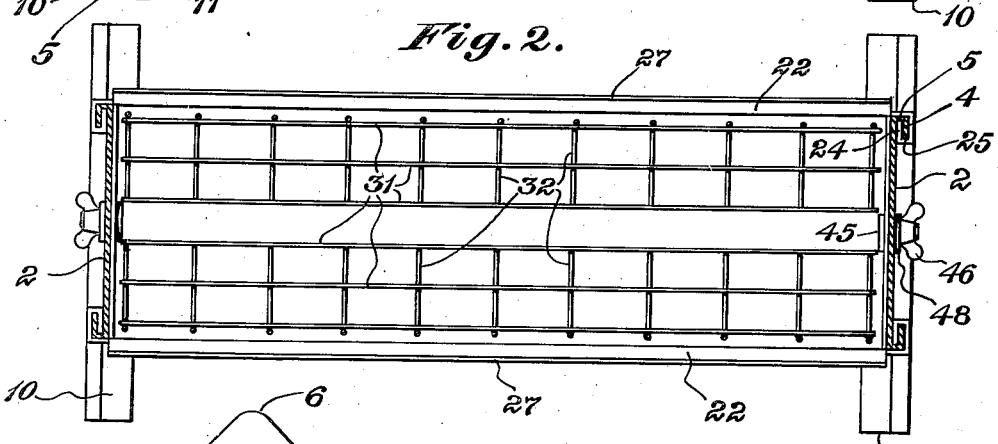
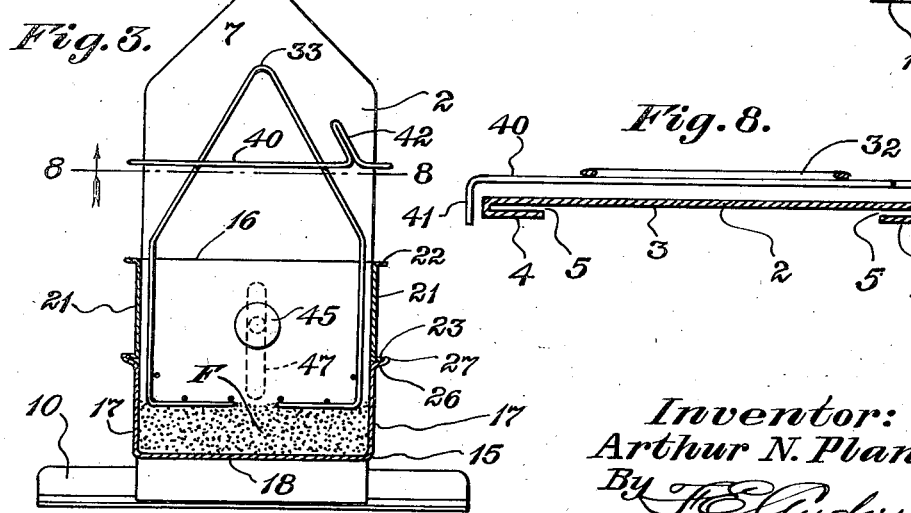
Inventor:
Arthur N. Plante
By F. E. Anderson
His Attorney March 31, 1942.   A. N. PLANTE   2,278,281
POULTRY FEEDER
Filed Sept. 3, 1940   3 Sheets-Sheet 2
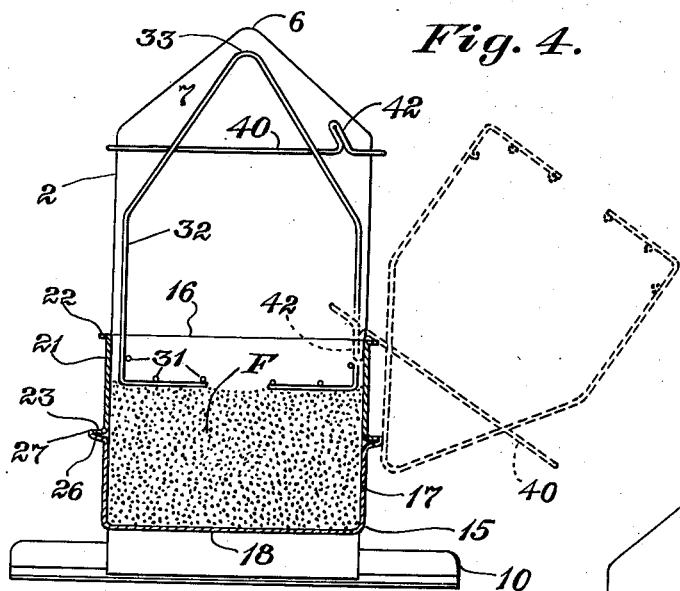
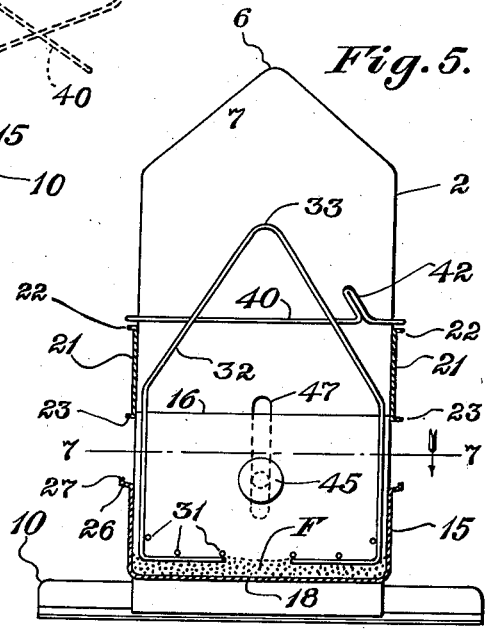
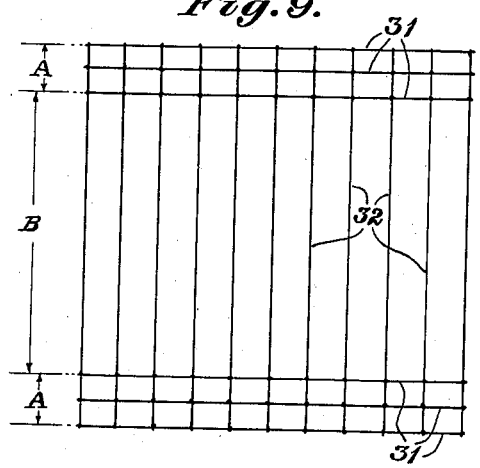
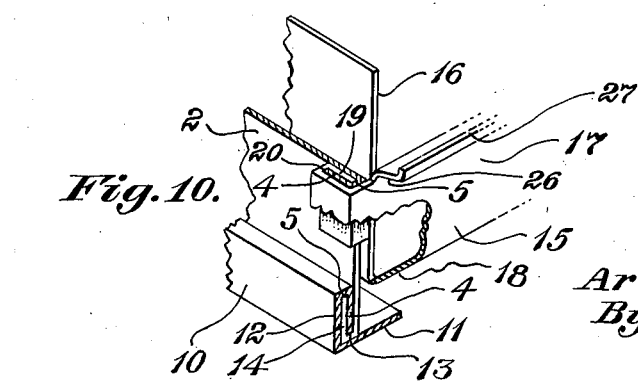
Inventor:
Arthur N. Plante
By F. E. Anderson
His Attorney March 31, 1942.  A. N. PLANTE  2,278,281
POULTRY FEEDER
Filed Sept. 3, 1940  3 Sheets-Sheet 3

Inventor:
Arthur N. Plante
By His Attorney

Patented Mar. 31, 1942

2,278,281

UNITED STATES PATENT OFFICE 2,278,281

POULTRY FEEDER

Arthur N. Plante, Torrington, Conn.

Application September 3, 1940, Serial No. 355,175

8 Claims. (Cl. 119—61)

This invention relates to poultry feeders of the trough type which commonly are made largely of sheet metal. A primary object of the invention is the provision of a feeder that will contain a quantity of mash or other similar feeds and protect it from soil and waste while it is maintained freely and equally accessible to each bird of a considerable flock. A further object of the invention is the provision of a feeder made of simply formed parts adapted to be readily assembled without the use of tools or disassembled with equal facility so that the separated parts may be conveniently cleaned or packed into reduced space for shipment or storage. Another object of the invention is the provision of a feeder made of parts that are adjustable so that their arrangement may be made suitable for the size of both young and advanced birds.

With these objects in view together with others that will become apparent, I have illustrated in the accompanying drawings one convenient form of embodiment of the invention which to enable those skilled in the art to practice the same will be set forth fully in the following detailed description while the novelty of the invention is defined in the appended claims.

In the drawings:

Figure 1 is a side view of a poultry feeder constructed in accordance with my invention.

Figure 2 is a sectional plan view on line 2—2 of Fig. 1.

Figure 3 is a transverse sectional view of the feeder shown in Fig. 1.

Figures 4 and 5 are transverse sectional views similar to Fig. 3 but showing certain parts in different position.

Figure 8 is a sectional view on line 8—8 of Fig. 3, looking in the direction of the arrow.

Figure 9 is a diagrammatic view of a blank for making the member shown in Fig. 6.

Figure 10 is a detail view hereinafter more fully described.

Figure 7:
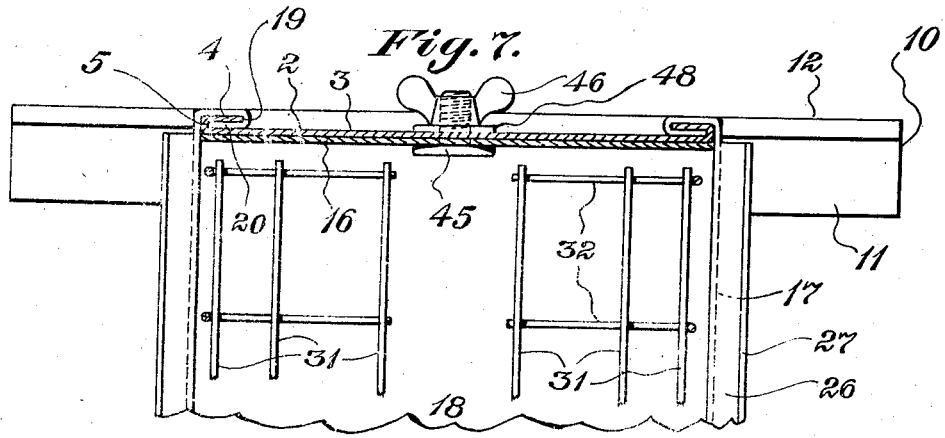
Figure 7 is a sectional view on line 7—7 of Fig. 5.

Referring to the drawings the trough structure to be described is supported by end standards which are identical in construction. Each standard includes a sheet metal plate 2 which for the purpose of attaching other parts thereto (see Figs. 7 and 10) is provided along its bottom and upright side edges with a narrow margin folded over toward its outer surface 3 to form in each case a tongue 4 and channel 5. Above the folded margins thereof the side edges of plate 2 converge toward an apex 6 to form a gable-shaped end 7 for a purpose that will hereinafter appear. For stabilizing the bottom edge of each upright standard 2, there is provided an angle bar 10 of which one leg as 11 is adapted to engage the floor or ground while the other leg 12 is folded inwardly to form tongue 13 and channel 14. A bar such as 10 is assembled with an end upright or standard 2 by sheathing or telescoping together their respective and appropriate folded edges.

Supported between end standards 2 is a trough 15 of which each end wall 16 is (for a purpose that will presently appear) about twice the height of side walls 17. These end and side walls are bent up from the bottom 18 with the ends extended between the sides in close engagement therewith and with the sides extended beyond the end walls in a margin that is folded over inwardly to form tongue 19 and channel 20. To assemble a trough with a pair of end standards 2, each tongue 19 and channel 20 of the trough is sheathed together with its appropriate tongue 4 and channel 5 of the standards. The joints thus formed may be made sufficiently close to resist under normal conditions displacement of the trough from such adjustment upon the standards as may furnish the desired trough height. While the capacity of trough 15 is suitable for chicks up to a certain stage in their growth, thereafter a trough of larger capacity is desirable. Supplemental side panels 21 are therefore provided. Each of these panels merges at top and bottom into respective flanges 22 and 23 with that portion of the panels between the flanges extended therebeyond in a margin that, like the sides of trough 15, is folded over to form tongue 24 and channel 25 adapted for sheathed engagement with their mating marginal formation of end standards 2. The above mentioned panel flanges 22 and 23 serve to give to a panel substantial rigidity and the lower flanges 23 are adapted to mate with similar flanges 26 on the sides of trough 15. The latter flanges terminate in a slight upturned lip 27 which tends to close any crevice between the side and panel flanges that otherwise might permit leakage of mash or grain when the panels are used to increase capacity of trough 15 as shown in Figs. 3 and 4. The height of panels 21 is made to match the beforementioned extra height of trough ends 16 which determines the extra capacity provided by use of said panels. When the trough capacity is sufficient without the described use of side panels 21, that is to say, when the trough is used for feeding small chicks, said panels are adjusted upwardly on the end standards 2 until there is sufficient space between the edge of the trough sides and the bottom edge of respective side panels to provide access of the chicks' heads therebetween.

Figure 6:
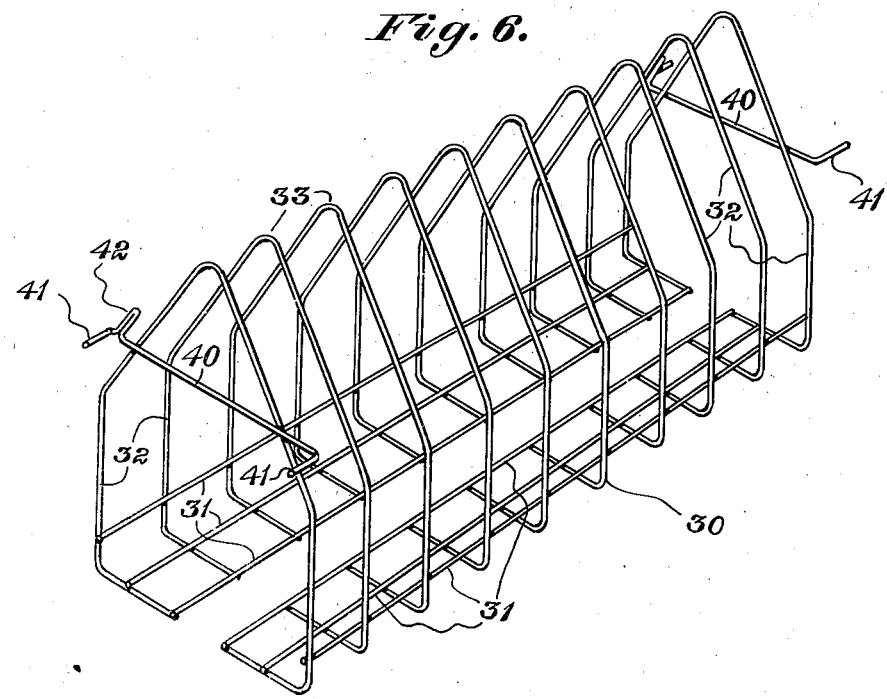
Figure 6 is a perspective view of a guard member.

Description now follows of a guard for use in combination with the feed trough as thus far explained. Such a guard 30 is shown per se in Fig. 6, and its purpose is to rest on the surface of the feed F while extending in contact therewith throughout a substantially flat base area defined by spaced longitudinal bars 31 crossed by spaced transverse bars 32, the latter extending upwardly from the sides of the base to meet or merge above the base in an apex 33 from which the side bars slope at an angle too steep for chicks to perch upon. The transverse bars 32 are sufficiently spaced apart to admit chicks' heads therebetween. The longitudinal bars are spaced to form with the transverse bars a reticulated screen with openings to expose adequate areas of feed. This screen prevents scattering of the feed by the birds. The screen remains in contact with the feed at all times by settling with the feed as it diminishes. As shown longitudinal bars 31 extend along each side wall of the guard adjacent juncture thereof with the base. This tends to give more stability to the transverse bars 32 above the base. Hereafter, however, in referring to the longitudinal bars as confined substantially to the base area, the arrangement wherein longitudinal bars are slightly spaced therefrom is included. From the foregoing description it will be apparent that the guard 30 forms a skeletonized tube adapted to extend along trough 15 from one end standard 2 to the other. When in its normal relation to the trough structure, the ends of tubular guard 30 are closed by the gable-shaped extensions 7 of the standards.

By referring to Fig. 4 which shows guard 30 supported with a considerable portion thereof above the edges of the nearly filled feed receptacle, it will be apparent that activity of the birds might displace the guard by tilting it to one side or the other were not means provided to prevent such occurrence. Effective for this purpose is a transverse rod or wire as 40 secured to either one or both ends of the guard with free ends 41 of the rod bent outwardly to straddle the adjacent end standard. Obviously engagement of the parts indicated will prevent displacement of the guard. For convenience in replenishing a trough with feed, removal of guard 30 is desirable in order that the feed may be suitably distributed to roughly level off the surface thereof for support of the protecting screen or base of said guard. When thus removed the guard should preferably be kept from possible contact with filth liable to be on adjacent floor or ground surface. Each guard 40 therefore is provided with an offset spur 42 which forms a hook by which the guard may be hung from a side of the trough as illustrated in Fig. 4 in dotted lines.

While a specific embodiment of my invention has been described it will be apparent that the form, construction and arrangement of the parts employed may be varied without departure from the scope of the invention as set forth in the following claims.

Having thus described my invention, what I claim is:

1. A poultry feeder including in combination, a pair of sheet material standards, opposite upright edges of each standard having a margin folded over toward the outer surface of the standard to form a tongue and channel, and a sheet material trough having the side walls thereof terminating beyond the end walls in respective margins, each of which is folded inwardly to form a tongue and channel adapted for sheathed slidable engagement with a similarly formed and appropriate margin of the end standards.

2. A poultry feeder including in combination, a pair of sheet material standards, opposite upright edges and the bottom edge of each standard having a margin folded over toward the outer surface of the standard to form a tongue and channel, an angle bar for each end standard having a leg thereof folded inwardly to form a tongue and channel adapted for sheathed slidable engagement with the similarly formed bottom edge of a standard, and a sheet material trough having the side walls thereof terminating beyond the end walls in respective margins, each of which is folded inwardly to form a tongue and channel adapted for sheathed slidable engagement with a similarly formed and appropriate margin of the end standards.

3. A poultry feeder including in combination, a pair of sheet material standards, opposite upright edges of each standard having a margin folded over toward the outer surface of the standard to form a tongue and channel, a sheet material trough having side walls and higher end walls, said side walls terminating beyond the end walls in respective margins, each of which is folded inwardly to form a tongue and channel adapted for sheathed slidable engagement with a similarly formed and appropriate margin of the end standards, and side panels terminating in margins folded like corresponding margins of the sides for similar engagement with the end standards, said panels serving to increase capacity of the trough to the height of the trough ends but movable relatively to the trough sides.

4. A poultry feeder including in combination, a pair of sheet material standards, opposite upright edges and the bottom edge of each standard having a margin folded over to form a tongue and channel, an angle bar for each end standard having a leg thereof folded to form a tongue and channel adapted for sheathed slidable engagement with the similarly formed bottom edge of a standard, a sheet material trough having side walls and higher end walls, said side walls terminating beyond the end walls in respective margins, each of which is folded to form a tongue and channel adapted for sheathed slidable engagement with a similarly formed and appropriate margin of the end standards, and side panels terminating in margins folded like corresponding margins of the sides for similar engagement with the end standards, said panels serving to increase capacity of the trough to the height of the trough ends but movable relatively to the trough sides.

5. A poultry feeder including in combination, a feed receptacle and a guard, the latter comprising as a whole a skeletonized member wherein crossed bars define a substantially flat base area adapted to extend over and be supported by feed in the receptacle, certain of the bars rising from the base in spaced relation to form the upper portion of the guard, and a transverse bar secured across each end of the guard, said bars having offset spurs for supporting the guard exteriorly of the receptacle from one side thereof.

6. A poultry feeder including in combination, a trough, a guard, said trough having end walls extended higher than its side walls and the guard comprising as a whole a skeletonized member wherein longitudinal and transverse bars define certain walls of a tube including a substantially flat base area and side walls rising therefrom, said longitudinal bars being confined substantially to the base area which is adapted to extend over and be supported by contact with feed in the trough while the ends of said tube are covered by respective end walls of the trough, and a transverse bar secured across each end of the tube said bar having offset spurs for engagement with the trough structure while the guard is in either normal position or exterior to the trough.

7. As an article of manufacture, a poultry feeder guard comprising as a whole a skeletonized member wherein longitudinal and transverse bars define tube walls including a substantially flat base area and side walls rising therefrom, said longitudinal bars being confined substantially to the base area where at two adjacent longitudinal bars respective ends of each transverse bar terminate, and a transverse bar secured across each end of the guard, said bars each having offset spurs.

8. A poultry feeder including in combination, a pair of sheet material standards, opposite upright edges of each standard having a margin folded to form a tongue and channel, and a sheet material trough having side walls thereof terminating beyond the end walls in respective margins, each of which is folded to form a tongue and channel adapted for sheathed slidable engagement with a similarly formed and appropriate margin of the end standards.

ARTHUR N. PLANTE.